INVENTOR:
CHARLES C. RIPLEY
BY: John R. Duncan
ATTORNEY

May 22, 1973  C. C. RIPLEY  3,734,824
NUCLEAR REACTOR CONTROL ROD DRIVE WITH ROD
POSITION INDICATING MEANS
Filed April 14, 1969  4 Sheets-Sheet 4
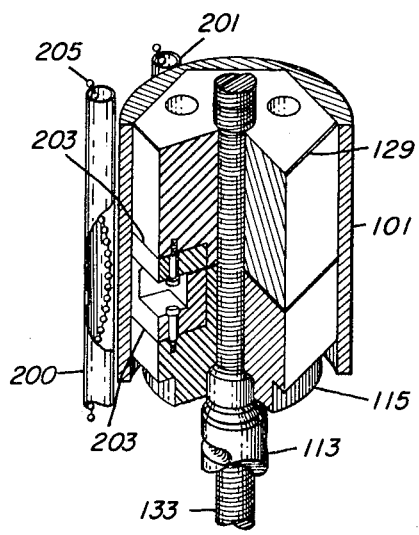
Fig. 6
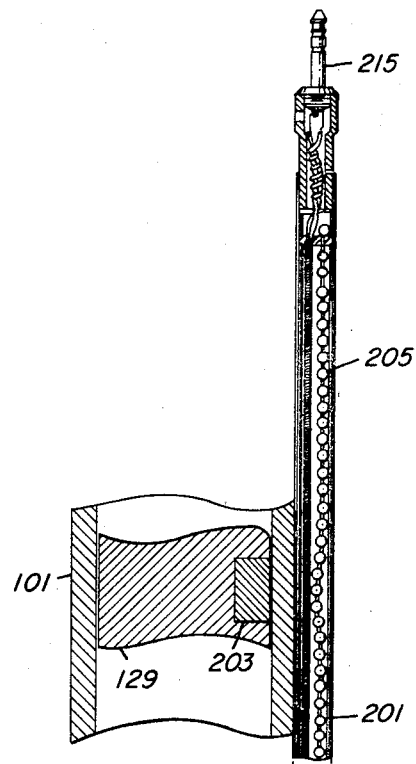
Fig. 7
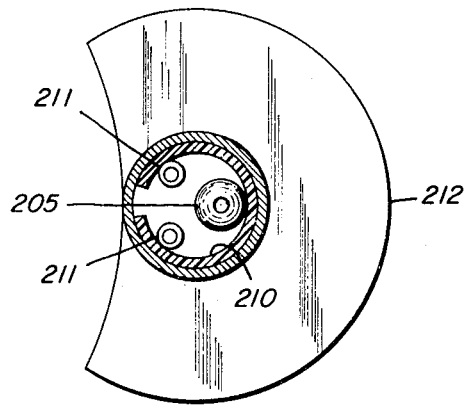
Fig. 8
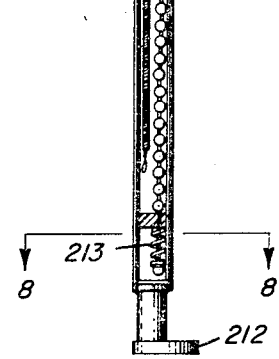

United States Patent Office 3,734,824
Patented May 22, 1973

3,734,824
NUCLEAR REACTOR CONTROL ROD DRIVE WITH ROD POSITION INDICATING MEANS
Charles C. Ripley, San Jose, Calif., assignor to General Electric Company
Filed Apr. 14, 1969, Ser. No. 815,608
Int. Cl. G21c 7/08
U.S. Cl. 176—36 R        22 Claims

ABSTRACT OF THE DISCLOSURE

A nuclear reactor control element drive system is disclosed which is capable of both gradual movement during normal reactor operation and high speed insertion in the event of a reactor emergency. This assembly is extremely compact both in length and in permitting close center-to-center mounting. An accurate system for indicating the position of the control elements is included. Safety and reliability are enhanced by a trapped part design which eliminates the need for numerous fasteners and permits rapid, convenient maintenance of the components in the mechanism.

BACKGROUND OF THE INVENTION

Nuclear chain fission reactions and the reactors in which they take place are now well known. A typical reactor includes a chain reacting assembly or core made up of fissile nuclear fuel material contained in fuel elements. The fuel material is generally encased in corrosion-resistant heat conductive containers or cladding. The reactor core, made up of a plurality of these fuel elements or rods in spaced relationship plus control elements, such as rods or blades, in-core instrumentation, etc. is enclosed in a container or core shroud through which the reactor coolant flows. As the coolant passes between the spaced fuel rods, it is heated by thermal energy released in the fuel during the fission reaction. The heated coolant then leaves the reactor, the heat energy is used to perform useful work such as by driving a turbine-generator set to produce electrical power, and the now-cooled coolant is recycled back to the reactor. When a reactor core is initially constructed, it contains more than the critical amount of fissionable fuel material so that the effective multiplication factor (the ratio of the number of neutrons produced by fission in each generation to the number of neutrons present in the preceding generation) can be made greater than unity. During normal reactor operation, the multiplication factor is controlled by the introduction into the reactor core of one or more control elements which contain neutron absorbing materials and which generally have a rod or blade configuration.

The power output of a reactor is proportional to the density of neutrons in a reactor core. The power output of the reactor core can easily be changed, either by withdrawing the control elements to make the multiplication factor greater than one to increase the power output, or by inserting the control elements to make the multiplication factor less than one to decrease the power output. In either case, when power reaches the desired level, the control elements are moved sufficiently to restore the multiplication factor to one. The rate at which the neutron density, and therefore power output, increases or decreases depends upon the amount by which the multiplication factor is greater or less than unity. To shut down the reactor, the control elements are fully inserted to make the multiplication factor considerably less than one, thereby causing neutron density and power output to decrease to a negligible level.

In order to control the power output of the reactor, it is necessary to provide drive means for the control elements which are capable of reliably and accurately moving and holding the control elements at any desired position in the reactor core. In addition, it is necessary that the control element drive system be capable of quickly and reliably shutting down the reactor in the event of an emergency. These conflicting requirements, between the need for accurate incremental movement during normal reactor operation and rapid insertion during an emergency cause many problems in the design of reactor control drive systems. In fact, the difficulty in meeting these conflicting requirements has resulted in some reactors having two separate, redundant control systems one of which is used only for normal reactor control and the other of which is used as a backup system for use only during emergencies. The backup or "scram" type control rods are withdrawn entirely from the reactor core during reactor operation and are inserted only to shut the reactor down. The normal operation or "shim" type control elements are capable of only very gradual movement and are used only to control reactor power level during normal operation. The shim elements are substantially entirely inserted at the beginning of operation with a new core fuel load, are gradually withdrawn as the fuel material is consumed during reactor operation and are substantially entirely withdrawn near the end of the useful life of the fuel load. Such a redundant system is highly disadvantageous since the dual system occupies a substantial amount of volume within the core which would desirably be occupied by fuel material. Also, the duplicate system is expensive and requires additional space within the reactor vessel outside the core and requires additional maintenance.

Thus, it would be highly desirable to provide a single control system which is capable of functioning in both the shim and scram modes of operation. It is, of course, extremely difficult to provide a multi-purpose drive system which is as effective in either modes as the duplicate system.

The usual prior art single or dual purpose control drive system projects outside the core shroud a distance equal to the distance from the shroud wall to the opposite end of the core in order to house the control element drive shaft when the control element is substantially fully withdrawn from the core. It would be desirable to reduce this length since it would greatly reduce the clearance requirements between the vessel and the surrounding building. Also, drive diameter is often critical since it may determine the minimum center-to-center spacing of adjacent control elements.

With any control drive system, it is necessary to include a system for indicating with high accuracy and reliability, the position of the control element within the reactor core. Obtaining reliable position indication in the past has been difficult because of the hostile environment in which the indicator must operate. The indicating means is subject to high irradiation levels, high temperatures and often is in contact with water, steam, liquid metals, etc. at high temperatures.

Thus, there is a continuing need for improved control element drive systems of improved simplicity and reliability.

SUMMARY OF THE INVENTION

It is, therefore, an object of this invention to provide a control element drive system overcoming the above-noted problems.

Another object of this invention is to provide a control element drive system which is capable of both gradual accurate adjustment and of high speed insertion.

Still another object of this invention is to provide a more compact control element drive system.

Yet another object of this invention is to provide a control element drive system including a highly accurate position indicating means.

The above objects, and others, are accomplished in accordance with this invention by a control element drive system which includes a screw actuated control element position adjusting means and a separable piston-driven means for rapidly inserting the control element into the reactor core in the event of an emergency. Automatically operating latches are provided to hold the control element in the fully-inserted emergency position. Indicator means are provided to show both the position of the control element and to indicate whether it is operating in the gradual adjustment or emergency mode. This drive is unusually compact both in length and in diameter, thereby permitting a closer center-to-center spacing of adjacent control rod drives.

BRIEF DESCRIPTION OF THE DRAWINGS

Details of the invention and of a preferred embodiment thereof will be further understood upon reference to the drawing wherein:

FIG. 6 shows an isometric detail view of a portion of the drive pointing out the operating mode indicating means;

FIG. 7 shows a vertical section through the position indicating means; and

FIG. 8 shows a horizontal section through the indicating means shown in FIG. 7, taken on line 8—8 in FIG. 7.

DETAILED DESCRIPTION OF THE INVENTION

Figure 1:
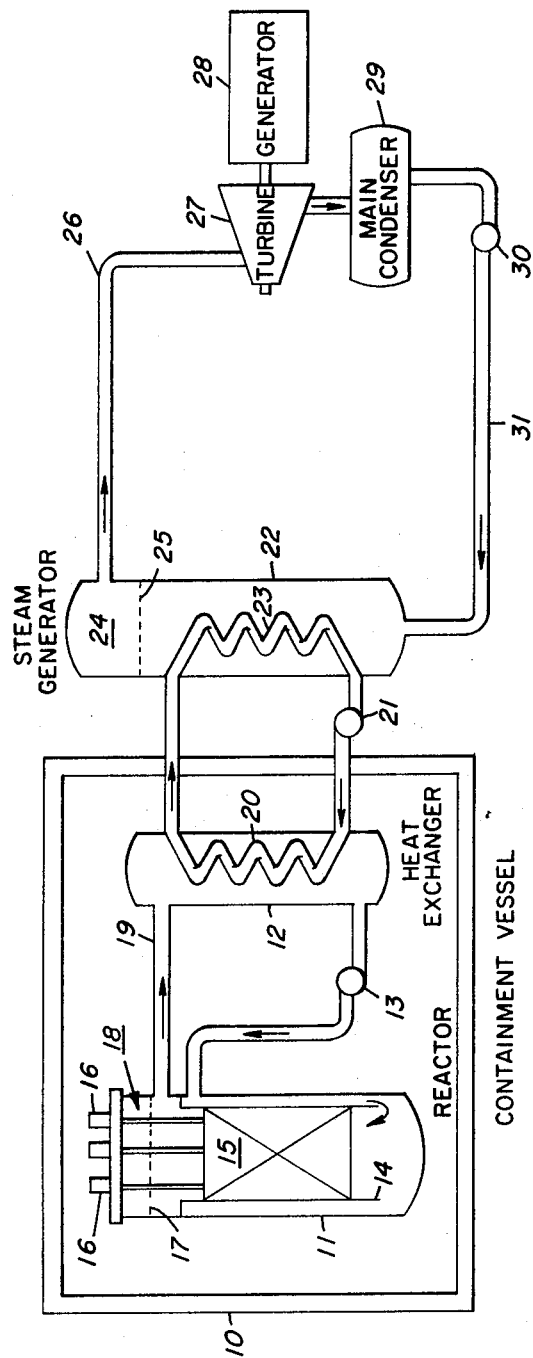
FIG. 1 shows a schematic representation of a typical nuclear reactor power generation system including the control element drive of this invention.

Referring now to FIG. 1, there is seen a schematic representation of a power generation system including a nuclear reactor energy source. The control element drive system is especially suitable for use in a reactor and power generation system of this type. The system includes a nuclear reactor of the liquid metal cooled fast breeder type with top entry control elements. A containment vessel surrounds the reactor and first heat exchanger 12. Liquid sodium is pumped by pump 13 into reactor 11 where it passes downwardly in an annular space between shroud 14 and the interior wall of reactor 11. The sodium then passes upwardly through core 15 which is made up of a plurality of spaced clad fuel bodies where it is heated by thermal energy given off in the fuel. The reactivity of core 15 is controlled by a plurality of control elements, driven by control drives schematically indicated at 16. The level of sodium within reactor 11 is indicated by dashed line 17. Above this liquid sodium surface is a covered gas space 18, typically filled with argon.

The heated sodium passes through line 19 to heat exchanger 12. The sodium from reactor 11 gives off heat to a second sodium stream which is pumped through core 20 in the heat exchanger 12 by pump 21. The cooled reactor sodium is recycled to reactor 11 by pump 13, as described above.

The now-heated second sodium stream passes to steam generator 22 where the sodium in core 23 is brought into indirect heat-exchange relationship with water to produce steam. The cooled sodium is recycled to heat exchanger 12 by pump 21, as described above.

Steam formed in steam generator 22 rises to steam space 24 above the water line indicated by the dashed line at 25. The steam passes through line 26 to turbine 27 which drives electrical generator 28. Steam leaving turbine 27 is condensed in main condenser 29 and pumped by pump 30 through line 31 back to the steam generator.

While the control drive systems of the present invention are specially well adapted for use in the power generation systems such as that shown in FIG. 1, they may be used in any other suitable type of reactor, as desired. A liquid metal cooled reactor has stringent control requirements, which require control systems which are reliable and versatile. It is desirable that a large number of closely spaced control rods be used, thus requiring close center-to-center spacing of the control drives 16. It is necessary that the drive be capable of very accurately and gradually moving the control rods among different positions in the core to adjust the reactor power level in response to varying load conditions. Also, it is necessary that the control drives be capable of very rapidly and positively driving the control elements into a fully inserted condition in the event of a reactor or system emergency.

Figures 2A, 2B:
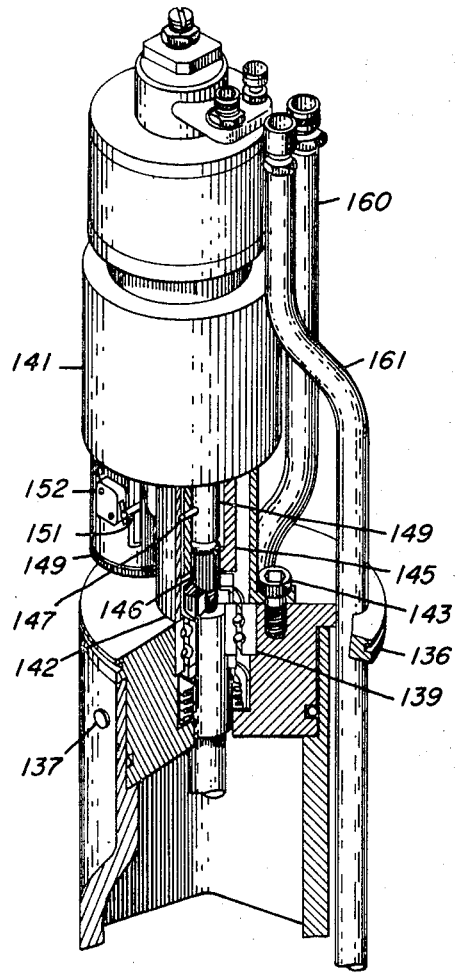
FIGS. 2a and 2b show a broken isometric view of the control element drive in the fine adjustment position.

FIGS. 2a and 2b show isometric views, partially broken away, of the upper and lower portions of the drive mechanism with the system in the gradually adjustable or "shim" arrangement. As shown in FIGS. 2a and 2b, the system is capable of very gradual controlled movement with continuous accurate monitoring of the control element position. The upper end of the drive system as shown in FIG. 2a axially aligns with the lower portion shown in FIG. 2b. The drawing shows these portions separated for clarity in the drawings.

Figure 5:
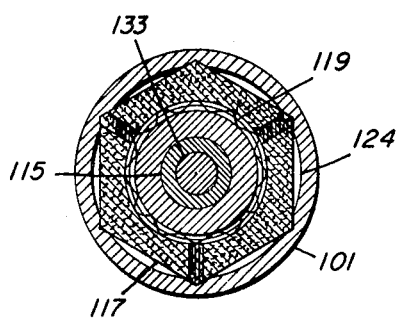
FIG. 5 shows a section through the control element drive taken on line 5—5 in FIG. 2.

The drive system is arranged for insertion in an opening in the reactor cover 100. Most of the drive components are contained within a housing 101 which has a generally cylindrical exterior surface and a hexagonal bore (in this embodiment). Housing 101 is mounted in a seal plug 102 by means of a plurality of mounting pins 103 which engage in a bayonet-type slot and groove arrangement in seal plug 102. Seal plug 102 is mounted within an opening in cover 100 and secured thereto by mounting pins 105 which ride in a bayonet-type slot and groove arrangement. Lower drive cylinder head 107 is threadedly mounted within seal plug 102. Drive cylinder head 107 contains an axial bore 108 through which the control element actuating tube 109 passes. The lower end of actuating tube 109 is connected to the upper end of the control rod or blade (not shown). A penetration seal 110 is provided to seal the space between the inner wall of seal plug 102 and actuating tube 109 to prevent leakage out of or into the control drive. A seal fluid may be admitted through line 111 to cool seal 110 and prevent reactor coolant from passing upwardly into the control rod drive system. A buffer throttle 113 consisting of a tapered portion on the outer wall of actuating tube 109 is provided to slow the descent of the control system near the lower end of its range of movement. As buffer throttle 113 enters bore 108 the compression of gas within the lower portion of drive housing 101 will increase, slowing the descent of the actuating tube. Actuating tube 109 is secured to lower piston 115 by a pin 116. Piston 115 has an external surface which fits within the hexagonal internal bore of housing 101. A seal member 117 is installed within a radial recess in the lower portion of piston 115. This seal serves to prevent the passage of actuating gas upwardly or downwardly through housing 101 past lower piston 115. This seal consists of a plurality of segments which are biased outwardly against the inner wall of housing 101 by a spring 119. Details of the arrangement of spring 119 and seal 117 are shown in FIG. 5. The upper end of lower piston 115 includes a plurality of radially spaced notches 121 each of which contains a latch member 122. Each latch member 122 includes an outwardly extending rib 123 adapted to engage latch notches 124 in the wall of housing 101. Upwardly extending fingers 127 on latches 122 are adapted to engage holes 128 in upper piston or nut 129 when nut 129 is adjacent lower piston 115. Thus, when finger 127 engages hole 128, the latch members 122 are moved inwardly bringing ribs 123 out of engagement with notches 124. When the piston 115 and nut 129 are separated, latches 122 are free to move outwardly bringing ribs 123 into engagement with notches 124. Thus, when the pistons are out of engagement, piston 115 may be moved downwardly since the sloping lower portion of ribs 123 will cam out of notches 124. However, it will not be possible to move piston 115 upwardly since this movement will force ribs 123 into tight engagement with notches 124. The lower end of latches 122 resting in piston notches 121 has a curved surface 131 which aids in the outward movement of ribs 123. If desired, a spring may be provided between the inner side of each latch 122 and the adjacent wall of piston 115 to aid in the outward movement of the latch when fingers 127 are not engaged with holes 128.

Figure 4:
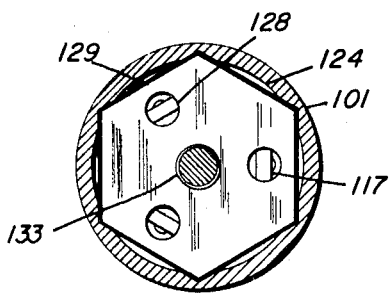
FIG. 4 shows a section through the control element drive taken on line 4—4 in FIG. 2.

An elongated threaded member or screw 133 extends downwardly through nut 129 and piston 115 and into actuating tube 109. Inner threads on nut 129 engage screw 133. Screw 133 does not engage piston 115 or actuating tube 109, but is loosely housed therein. Details of upper nut 129 are further pointed out in FIG. 4 which shows a horizontal section through the drive. As seen in FIG. 4, the latch fingers 127 extend up into holes 128 which cam the latches out of engagement with notches 124 in the walls of housing 101.

The upper end of screw 133 passes upwardly through cylinder end cap 136 and is supported by a bearing 139 in end cap 136. A locking pin 137 secures end cap 136 to housing 101. A drive motor 141 is provided to rotate screw 133. Drive motor 141 is mounted on support tube 142 which is secured to end cap 136 by cap screws 143. An internally splined sleeve 145 connects drive motor 141 in operating relationship with splined shaft 146 on the end of screw 133. A pin 147 connects sleeve 145 to the output shaft 148 of drive motor 141.

A nut position indicator and gear means 149 may be provided to indicate the position of the nut within housing 101. Gear 149 engages gear 146 so that it rotates with screw 133. Thus, the position of gear 149 is indicative of the position of nut 129 within housing 101. Remote indicating stations of a conventional nature may be connected to indicator gear 149, if desired. Also, a pin 151 mounted on a traveler on a lead screw (not shown) connected to indicator gear 149 may be included to actuate limit switches 152 to stop the drive motor when piston 129 has reached the maximum upper or lower position.

Figure 3:
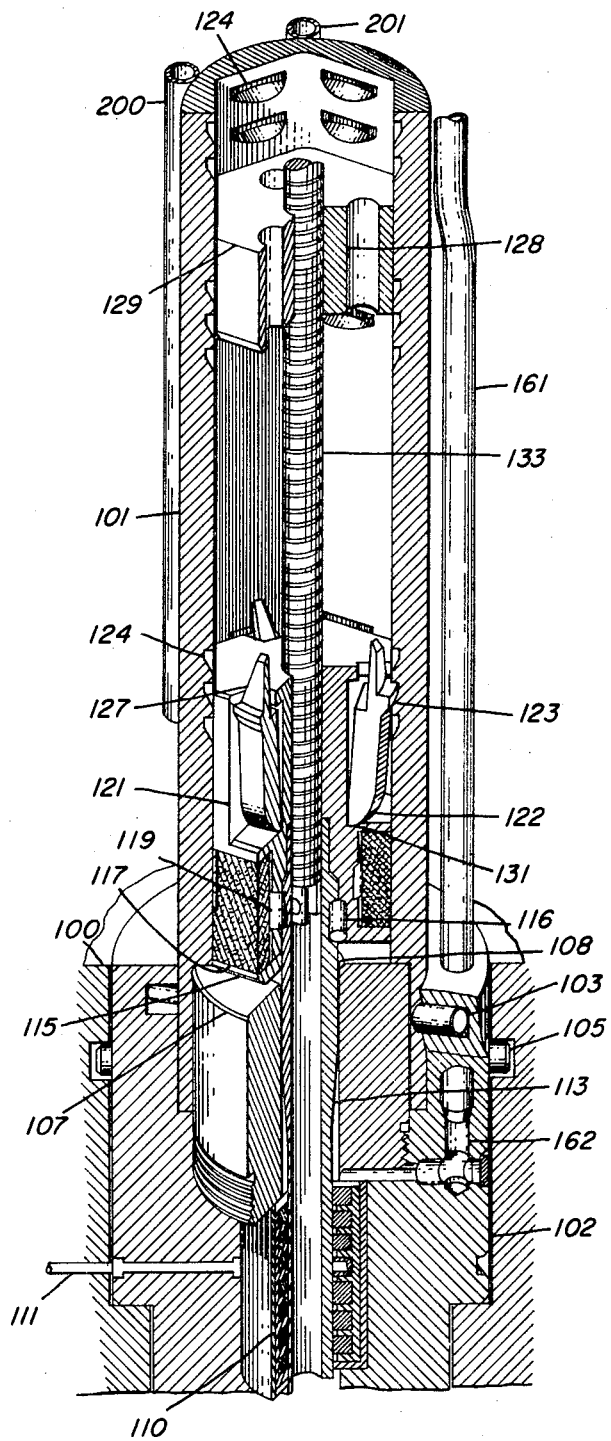
FIG. 3 shows a broken isometric view of the lower portion of the control element drive in the reactor shutdown position.

Lower piston 115 can be driven downwardly within housing 101 independent of nut 129 to the position shown in FIG. 3. Gas supply lines 160 and 161 are provided to introduce high pressure gas within housing 101. When high pressure gas is introduced through line 160 through an opening (not shown) in upper cap 136, the pressure is transmitted through holes 128 in nut 129 into contact with the upper surface of piston 115. Where the pressure on the upper surface of piston 115 exceeds the pressure on the lower surface of piston 115, the piston will be driven rapidly downward. Since piston 115 is secured to control element actuating tube 109, the control element will be rapidly and positively inserted into the core. Since the latches 122 will be disengaged from upper nut 129, they will be free to move outwardly. Outer ribs 123 will engage the lower set of latch notches 124.

After the emergency which has caused the "scram" has ended, the gas pressure on lower piston 115 will be equalized by equalizing the gas pressure introduced through lines 160 and 161. Gas entering through line 161 passes downwardly through opening 162 in seal plug 102 so as to enter the housing 101 below lower piston 115. Drive motor 141 is then actuated to rotate screw 133 and move nut 129 downwardly within housing 101. Finally, nut 129 engages lower piston 151 so that the inner surface of holes 128 engage fingers 127 and withdraw ribs 123 from engagement with latch notches 124. If slightly higher gas pressure is maintained on the lower surface of lower piston 115 through line 161 than on the upper surface thereof, lower piston 115 will move upwardly with nut 129 when nut 129 is moved upwardly by screw 133. Thus, the system is returned to the gradual adjustment or "shim" mode of operation.

Means for indicating the position of the control element and for indicating whether the nut 129 and piston 115 are traveling together or have been separated is shown in detail in FIGS. 6 through 8. Two separate indicating means are provided. Separation indicator 200 indicates whether nut 129 and piston 115 are together or separate. Piston position indicator 201 indicates the actual position of piston 115. FIG. 6 shows an isometric view of a portion of the control rod drive, slightly rotated from the view shown in FIGS. 2 and 3, showing the separation indication system.

As seen in FIG. 6, nut 129 and piston 115 each carries part of a magnetic circuit 203. When the two magnetic portions are brought into contact, when the nut and piston are in contact, the magnetic force is sufficient to attract a bead chain 205 suspended within separation indicator 200. When the nut 129 and piston 115 are separated, each portion of the magnet has insufficient magnetic strength to attract bead chain 205. As is discussed further below, when bead chain 205 is attracted it completes an electric circuit which will cause a signal which can be monitored at a remote station.

The piston position indicator operates in a similar manner except that in this case a single magnet is contained within the outer surface of lower piston 115 adjacent the piston position indicator tube 201. Thus, the bead chain within tube 201 will be attracted adjacent the piston.

As seen in FIGS. 7 and 8, each of indicators 200 and 201 consists of a tube having an insulating inner layer 210 and a pair of resistance coils 211 located on the side of the tube adjacent the drive housing 101. Bead chain 205 is suspended within the tube out of contact with the resistance coils. When the bead chain 205 is attracted towards the housing by the magnet in the piston it will make contact with resistance coils 211, thereby completing a circuit through the ball chain and resistance coils. A spring 213 maintains bead chain 205 under tension and out of contact with resistance coils 211 except when attracted by magnet 203. The resistance in this circuit will be a direct indication of the distance the bead chain contact point is below the top of the indicating means. A foot 212 at the lower end of each indicating means is adapted to hold the indicator against the external surface of housing 101. Limit switches (not shown) may be included at the upper and lower ends of resistance coils 211. These switches could be of the reed type so that when the magnet in the pistons comes adjacent the switches the switches will close, thereby providing a reliable signal that the drive has scrammed and the control element is inserted. The switch can be used to actuate an annunciator, indicating that the control element is withdrawn, or act as back-up to upper limit switch 152. A conventional readily detachable electrical contact plug 215 may be provided at the upper end of each indicating means to permit attachment of leads to the monitoring means (not shown).

As can be seen from the above description, the control element drive system of this invention is highly compact both in diameter and in length. The combination of both "shim" and "scram" functions within a single control drive eliminates the expense, service and space problems caused by independent systems for each function. The piston position indicating means and piston separation indicating means are highly effective and reliable. The system described obviates the needs for flexible leads and traveling indicating means.

If desired, the internal bore of housing 101 could be other than hexagonal, so long as it prevents rotation of the parts within the bore. For example, a cylindrical piston with the drive screw passing through the piston and nut off-center would be suitable.

If desired, the configuration of the latch notches may be in a spiral pattern along the axis of the cylinder. The intersection of the spiral and the hexagonal bore is such that interrupted threads are in effect produced. Thus, although a highly economical continuous threading operation could be used to form the notches, the interrupted nature of the thread produced eliminates any "spiral leakage path" to bypass the piston actuating gas past seal 117.

While the control rod drive system described above may be used in any suitable nuclear reactor, it is especially effective in the liquid metal cooled fast breeder type reactors as described above.

Although specific arrangements and proportions have been described in the above description of a preferred embodiment, other suitable arrangements and components may be used as indicated above with similar results.

Other modifications and ramifications of the present invention will occur to those skilled in the art upon reading the present disclosure. These are intended to be included within the scope of this invention.

I claim:

1. A nuclear reactor control element drive system of compact design comprising:
   (a) an elongated housing having interior walls and an elongated bore of generally hexagonal cross section therewithin, the walls having a multiplicity of latch means therein and the housing extending away from a nuclear reactor;
   (b) a piston fitting within said bore having extending fingers and latch members with each latch member having an extending rib adapted to fit into the latch means;
   (c) connecting means including a buffer throttle of tapered cross section for damping, the connecting means connecting said piston with a reactivity control element within said reactor, whereby movement of said piston moves said control element within said reactor;
   (d) a nut having openings for receiving the extending fingers on the piston, the nut being capable of fitting within said bore adjacent the surface of said piston away from said reactor;
   (e) means to move said nut including a motor driven lead screw gradually along said bore with the extending fingers on the piston extending through the openings on said nut, whereby said control element is moved gradually within said reactor; and
   (f) means to separate said piston from said nut and to rapidly move said piston toward said reactor, whereby said control element is rapidly fully inserted into the maximum control position.

2. The control element drive system according to claim 1 further including anti-rotation means to prevent rotation of said piston and said nut within said bore.

3. A control element drive system according to claim 2 wherein said bore has a hexagonal internal cross-section and said nut and said piston each has a cooperating hexagonal external cross-section.

4. The control element drive system according to claim 1 further including at least one of the latch means being located in the housing to hold the piston in the fully inserted position after separation from said nut.

5. The control element drive system according to claim 4 wherein said latch means includes a plurality of latch members mounted on said piston, each latch member having an outwardly extending rib adapted to engage notches in the surface of said bore, each of said latches biased outwardly into engagement with said notches when said piston is separated from said nut, each of said latch members having an extending finger which engages said nut when said piston and said nut are in contact to move said latch members out of engagement with said notches.

6. The control element drive system according to claim 1 further including a separation indicator means adjacent said housing to indicate whether said nut and said piston are in contact or separated.

7. The control element drive system according to claim 6 wherein said indicator means includes a tube parallel with and adjacent to said housing; said tube containing at least one resistance coil within said tube on the side adjacent said housing and a bead chain extending through said tube normally out of contact with said resistance coil; a first magnet portion mounted on said piston adjacent said tube; a second magnet portion mounted on said nut adjacent said first magnet portion and said tube; said magnets having a sufficient strength when in contact to attract said bead chain into contact with said resistance coil to complete an electric circuit; each of said first and second magnets having insufficient strength to attract said bead chain into contact with said resistance coil when said piston and nut are separated.

8. The control element drive system according to claim 1 further including piston position indicating means comprising an elongated tube adjacent and parallel to said housing said tube containing at least one resistance coil extending through said tube on the side adjacent said housing and a bead chain extending through said housing normally out of contact with said resistance coil; and a single independent magnet mounted in said piston, said magnet having sufficient magnetic strength to attract said bead chain into contact with said resistance coil, thereby completing an electric circuit through said bead chain and resistance coil which indicates the position of said piston within said bore by the resistance of said circuit.

9. The control element drive system according to claim 1 wherein said means to move said nut gradually along said bore includes a lead screw threaded through said nut and driven by a motor drive means at the free end of said housing; first means for admitting a high pressure fluid into said bore against the surface of said piston away from said nut to hold said piston in contact with said nut; and second means for admitting a high pressure fluid into said bore against the surface of said piston toward said nut, to move said piston way from said nut.

10. In a nuclear reactor system including a nuclear reactor, a fuel-containing core within said reactor, at least one reactivity control element movable into and out of said core, and control drive means of compact design mounted on said reactor coupled to said control element to move said control element; the improvement wherein said control drive means includes:
   (a) an elongated rod connected to said control element and extending out of said reactor into an elongated bore of generally hexagonal cross section in a housing with the inside walls of the housing having a multiplicity of latch means therein;
   (b) a piston having extending fingers and latch members with each latch member having an extending rib adapted to fit into the latch means, the piston fitting within said bore and secured to said elongated rod so that movement of said piston within said bore moves said control element within said reactor;

(c) a nut having openings for receiving the extending fingers on the piston, the nut being capable of fitting within said bore adjacent the surface of said piston away from said reactor;

(d) means to move said nut including a motor driven lead screw gradually along said bore with the extending fingers on the piston extending through the openings on said nut, whereby said control element is moved gradually within said reactor; and (e) means to separate said piston from said nut and to rapidly move said piston toward said reactor, whereby said control element is rapidly moved into maximum control position fully inserted within said core.

11. The system according to claim 10 further including anti-rotation means to prevent rotation of said piston and said nut within said bore.

12. The system according to claim 11 wherein said bore has a hexagonal internal cross-section and said nut and said piston each has a cooperating hexagonal external cross-section.

13. The system according to claim 10 further including at least one of the latch means being located in the housing to hold the piston in the fully inserted position after separation from said nut.

14. The system according to claim 13 wherein said latch means includes a plurality of latch members mounted on said piston, each latch member having an outwardly extending rib adapted to engage notches in the surface of said bore, each of said latches biased outwardly into engagement with said notches when said piston is separated from said nut, each of said latch members having an extending finger which engages said nut when said piston and said nut are in contact to move said latch members out of engagement with said notches.

15. The system according to claim 10 further including a separation indicator means adjacent said housing to indicate whether said nut and said piston are in contact or separated.

16. The system according to claim 15 wherein said indicator means includes a tube parallel with and adjacent to said housing; said tube containing at least one resistance coil within said tube on the side adjacent said housing and a bead chain extending through said tube normally out of contact with said resistance coil; a first magnet portion mounted on said piston adjacent said tube; a second magnet portion mounted on said nut adjacent said first magnet portion and said tube; said magnets having a sufficient strength when in contact to attract said bead chain into contact with said resistance coil to complete an electric circuit; each of said first and second magnets having insufficient strength to attract said bead chain into contact with said resistance coil when said piston and nut are separated.

17. The system according to claim 10 further including piston position indicating means comprising an elongated tube adjacent and parallel to said housing said tube containing at least one resistance coil extending through said tube on the side adjacent said housing and a bead chain extending through said housing normally out of contact with said resistance coil; and a single independent magnet mounted in said piston, said magnet having sufficient magnetic strength to attract said bead chain into contact with said resistance coil, thereby completing an electric circuit through said bead chain and resistance coil which indicates the position of said piston within said bore by the resistance of said circuit.

18. The system according to claim 10 wherein said means to move said nut gradually along said bore includes a lead screw threaded through said nut and driven by a motor drive means at the free end of said housing; first means for admitting a high pressure fluid into said bore against the surface of said piston away from said nut to hold said piston in contact with said nut; and second means for admitting a high pressure fluid into said bore against the surface of said piston toward said nut, to move said piston away from said nut.

19. A nuclear reactor control element drive system comprising:

(a) a control element secured to an elongated rod extending out of a core of a reactor into an elongated bore within a housing having interior walls which have a multiplicity of latch means therein;

(b) a piston fitting within said bore secured to said elongated rod whereby a movement of said piston towards and away from said reactor moves said control element into and out of said core, the piston having extending fingers and latch members with each latch member having an extending rib adapted to fit into the latch means;

(c) a nut having openings for receiving the extending fingers on the piston, the nut being capable of fitting within said bore adjacent the surface of said piston away from said reactor;

(d) means to prevent rotation of said piston and said nut within said bore;

(e) means to move said nut including a motor driven lead screw gradually along said bore with the extending fingers on the piston extending through the openings on said nut so that the piston is maintained in contact with said nut, whereby said control element is moved gradually within said core;

(f) means to separate said piston from said nut and to rapidly move said piston toward said reactor, whereby said control means is rapidly fully inserted into the core;

(g) at least one of the latch means being located in the housing to hold the piston in the fully inserted position;

(h) indicator means indicating whether said nut and said piston are together or separate; and (i) means on said nut to release said latch means when said nut is brought into contact with said piston, whereby said nut and said piston may be again gradually moved together.

20. The control element drive system according to claim 19 wherein said latch means includes a plurality of latch members mounted on said piston, each latch member having an outwardly extending rib adapted to engage notches in the surface of said bore, each of said latches biased outwardly into engagement with said notches when said piston is separated from said nut, each of said latch members having an extending finger which engages said nut when said piston and said nut are in contact to move said latch members out of engagement with said notches.

21. The control element drive system according to claim 19 wherein said indicator means includes a tube parallel with and adjacent to said housing; said tube containing at least one resistance coil within said tube on the side adjacent said housing and a bead chain extending through said tube normally out of contact with said resistance coil; a first magnet portion mounted on said piston adjacent said tube; a second magnet portion mounted on said nut adjacent said first magnet portion and said tube; said magnets having a sufficient strength when in contact to attract said bead chain into contact with said resistance coil to complete an electric circuit; each of said first and second magnets having insufficient strength to attract said bead chain into contact with said resistance coil when said piston and nut are separated.

22. The control element drive system according to claim 19 wherein said means to move said nut gradually along said bore includes a lead screw threaded through said nut and driven by a motor drive means at the free end of said housing; first means for admitting a high pressure fluid into said bore against the surface of said piston away from said nut to hold said piston in contact with said nut; and second means for admitting a high pressure fluid into said bore against the surface of said piston toward said nut, to move said piston away from said nut.

References Cited

UNITED STATES PATENTS

| 3,020,887 | 2/1962 | Hobson et al. | 176—36 X |
| 3,154,472 | 10/1964 | Shannon | 176—36 |
| 3,296,081 | 1/1967 | Wildgoose | 176—36 X |
| 3,324,006 | 6/1967 | Challender et al. | 176—36 |
| 3,377,252 | 4/1968 | Knights | 176—36 |
| 3,432,387 | 3/1969 | Jonsson | 176—36 |
| 2,841,026 | 7/1958 | Glass | 176—366 X |

FOREIGN PATENTS

| 927,522 | 5/1963 | Great Britain. |
| 939,973 | 10/1963 | Great Britain. |

BENJAMIN R. PADGETT, Primary Examiner

H. E. BEHREND, Assistant Examiner